(12) United States Patent
Liu et al.

(10) Patent No.: US 11,431,742 B2
(45) Date of Patent: Aug. 30, 2022

(54) DNS EVALUATION METHOD AND APPARATUS

(71) Applicants: NSFOCUS INFORMATION TECHNOLOGY CO., LTD., Beijing (CN); NSFOCUS TECHNOLOGIES, INC., Beijing (CN)

(72) Inventors: Weixin Liu, Beijing (CN); Yuchao She, Beijing (CN)

(73) Assignees: NSFOCUS INFORMATION TECHNOLOGY CO., LTD., Beijing (CN); NSFOCUS TECHNOLOGIES, INC., Beijing (CN)

(*) Notice: Subject to any disclaimer, the term of this patent is extended or adjusted under 35 U.S.C. 154(b) by 195 days.

(21) Appl. No.: 16/498,900

(22) PCT Filed: Nov. 27, 2017

(86) PCT No.: PCT/CN2017/113183
§ 371 (c)(1),
(2) Date: Sep. 27, 2019

(87) PCT Pub. No.: WO2018/176874
PCT Pub. Date: Oct. 4, 2018

(65) Prior Publication Data
US 2020/0045070 A1 Feb. 6, 2020

(30) Foreign Application Priority Data
Apr. 1, 2017 (CN) .......................... 201710214360.5

(51) Int. Cl.
*H04L 29/08* (2006.01)
*G06F 16/28* (2019.01)
(Continued)

(52) U.S. Cl.
CPC ........ *H04L 63/1425* (2013.01); *G06F 16/285* (2019.01); *H04L 61/4511* (2022.05); *H04L 61/5007* (2022.05)

(58) Field of Classification Search
CPC ............. H04L 63/1425; H04L 61/1511; H04L 61/2007; G06F 16/285
See application file for complete search history.

(56) References Cited

U.S. PATENT DOCUMENTS 9,245,121 B1* 1/2016 Luo .................... H04L 63/14
2014/0157414 A1 6/2014 Atonakakis
(Continued)

FOREIGN PATENT DOCUMENTS

CN 101572701 A 11/2009
CN 102685145 A 9/2012
(Continued)

OTHER PUBLICATIONS

International Search Report (ISR) (with English translation) for corresponding Application No. PCT/CN2017/113183, dated Dec. 29, 2017.

*Primary Examiner* — Christopher B Robinson
(74) *Attorney, Agent, or Firm* — Renner, Otto, Boisselle & Sklar, LLP (57) ABSTRACT

A DNS evaluation method and apparatus. The method comprises: determining, according to a DNS traffic log, M domain names in a DNS system, and multiple pieces of feature dimension information about each category in pre-set categories corresponding to each of the M domain names, where M is an integer greater than or equal to 1; determining association identification information associated with each of the M domain names, wherein the association identification information comprises an IP address and/or identity information; determining, according to an association relationship between each of the M domain names and the association identification information, or attribute information about each of the M domain names, a cluster score for each category in the pre-set categories of the DNS system; and determining, according to the cluster score for each category in the pre-set categories of the DNS system, the total system score for the DNS system. Thus, the accuracy of DNS evaluation is improved.

10 Claims, 3 Drawing Sheets

(51) Int. Cl.
*H04L 29/12* (2006.01)
*H04L 9/40* (2022.01)
*H04L 61/4511* (2022.01)
*H04L 61/5007* (2022.01)

(56) References Cited

U.S. PATENT DOCUMENTS

| | | | | |
|---|---|---|---|---|
| 2015/0019708 A1* | 1/2015 | Denis | ............... | H04L 43/04 |
| | | | | 709/224 |
| 2015/0089056 A1* | 3/2015 | Holmes | ............... | G06Q 30/0273 |
| | | | | 709/224 |
| 2015/0365305 A1* | 12/2015 | Namata | ............... | H04L 61/4511 |
| | | | | 709/224 |
| 2016/0065534 A1* | 3/2016 | Liu | ............... | G06F 16/287 |
| | | | | 707/728 |
| 2016/0065597 A1* | 3/2016 | Nguyen | ............... | H04L 63/1441 |
| | | | | 726/22 |
| 2017/0041332 A1* | 2/2017 | Mahjoub | ............... | H04L 63/1441 |
| 2017/0041333 A1* | 2/2017 | Mahjoub | ............... | G06F 16/951 |

FOREIGN PATENT DOCUMENTS

| | | | | |
|---|---|---|---|---|
| CN | 104639388 A | | 5/2015 | |
| CN | 105119915 A | * | 12/2015 | ......... H04L 63/1416 |
| CN | 105357335 A | | 2/2016 | |
| CN | 105634845 A | | 6/2016 | |
| CN | 105812204 A | | 7/2016 | |
| CN | 106060067 A | | 10/2016 | |
| CN | 106533762 A | | 3/2017 | |
| CN | 107360185 A | | 11/2017 | |

\* cited by examiner

Fig. 5

DNS EVALUATION METHOD AND APPARATUS

This application is a National Stage of International Application No. PCT/CN2017/113183, filed Nov. 27, 2017, which claims priority to Chinese Patent Application No. 201710214360.5, filed with the Chinese Patent Office on Apr. 1, 2017, and entitled "Method and apparatus for evaluating DNS", which is hereby incorporated by reference in its entirety.

FIELD

Embodiments of the invention relate to the field of network security, and particularly to a method and apparatus for evaluating DNS.

BACKGROUND

In network communication, a server in the Internet shall be accessed using an IP address, but the IP address is not easy to memorize, so typically a corresponding domain name is input to access to one server, so that the domain name shall be parsed for a corresponding IP address, and only a client with the IP address corresponding to the domain name can access the server corresponding to the domain name, where the domain name is mapped to the IP address by a Domain Name Service (DNS).

The DNS is a distributed database for mapping between a domain name and an IP address over the Internet, and the DNS can provide a corresponding IP address, but also can enable various applications and networks to be deployed, so it relates to the applicability of the entire Internet. Accordingly, the security of the DNS itself is highly significant. In a real application, a hacker may tamper DNS setting on a computer or a router, and direct a normal network address to a phishing website, or a host controlled by the hacker to thereby swindle money from a user, or to pilfer privacy. A malicious DNS is so harmful that the property of a user may be lost, and even a website or a network may be broken down.

At present, a DNS is evaluated based on a single domain name, that is, the DNS is evaluated for a malignancy factor only according to the number of accesses by clients to a single domain name, and since the DNS is evaluated for a malignancy factor only based on the single domain name, an evaluation result may be less creditable.

In summary, it is highly desirable to provide a solution to evaluating DNS so as to improve the accuracy of DNS evaluation.

SUMMARY

Embodiments of the invention provide a method and apparatus for evaluating DNS so as to improve the accuracy of DNS evaluation.

In a first aspect, an embodiment of the invention provides a method for evaluating DNS, the method including: determining M domain names in a DNS system, and a plurality of pieces of feature dimension information of each of preset categories corresponding to each of the M domain names according to a DNS traffic log, wherein M is an integer more than or equal to 1; determining association identifier information associated with each of the M domain names, wherein the association identifier information include an IP address and/or identity information; determining a cluster score of each of the preset categories of the DNS system according to association relationships between each of the M domain names and the association identifier information and further in view of the plurality of pieces of feature dimension information of each of preset categories corresponding to each of the M domain names, or according to attribute information of each of the M domain names and further in view of the plurality of pieces of feature dimension information of each of preset categories corresponding to each of the M domain names; and determining a total system score of the DNS system according to the cluster score of each of the preset categories of the DNS system.

In the embodiment of the invention, the DNS system is evaluated according to the M domain names, and the plurality of pieces of feature dimension information of each of the preset categories corresponding to each of the M domain names, so the DNS can be evaluated using additional feature dimensions for evaluation to thereby improve the accuracy of evaluating the DNS; and furthermore the total system score of the DNS system can be determined according to the cluster scores of the respective preset categories of the DNS system to thereby further improve the accuracy of evaluating the DNS.

Optionally the determining the cluster score of each of the preset categories of the DNS system according to the association relationships between each of the M domain names and the association identifier information and further in view of the plurality of pieces of feature dimension information of each of preset categories corresponding to each of the M domain names, or according to the attribute information of each of the M domain names and further in view of the plurality of pieces of feature dimension information of each of preset categories corresponding to each of the M domain names includes: grouping the association identifier information associated with each of the M domain names into a first entity element group, and obtaining N first entity element groups; and determining first cluster scores of the preset categories of the DNS system according to the N first entity element groups and the feature dimension information, wherein N is an integer more than or equal to 1, and less than or equal to M; grouping domain names with differences between their attribute information being below a preset attribute threshold among the M domain names and the association identifier information associated with the domain names into a second entity element group, and obtaining K second entity element groups and the feature dimension information; and determining second cluster scores of the preset categories of the DNS system according to the K second entity element groups, wherein K is an integer more than or equal to 1; and determining the cluster scores of the preset categories of the DNS system according to the first cluster scores of the preset categories, and the second cluster scores of the preset categories.

Optionally the determining the first cluster scores of the preset categories of the DNS system according to the N first entity element groups and the feature dimension information includes: for each of the N first entity element groups, normalizing each of a plurality of pieces of feature dimension information corresponding to a target domain name in the first entity element group, wherein the target domain name is any one of the M domain names, determining feature dimension information corresponding to the association identifier information in the first entity element group, and determining the first cluster score of the DNS system according to each of the plurality of pieces of normalized feature dimension information corresponding to the target domain name in the first entity element group, and the feature dimension information corresponding to the association identifier information in the first entity element group; and the determining the second cluster scores of the preset categories of the DNS system according to the K second entity element groups and the feature dimension information includes: for each of the K second entity element groups, normalizing each of a plurality of pieces of attribute information corresponding to the domain name in the second entity element group, determining feature dimension information corresponding to the association identifier information in the second entity element group, and determining the second cluster score of the DNS system according to each of the plurality of pieces of normalized attribute information corresponding to the domain name in the second entity element group, and the feature dimension information corresponding to the association identifier information in the second entity element group.

Optionally the determining the total system score of the DNS system according to the cluster score of each of the preset categories of the DNS system includes: normalizing each of a plurality of pieces of feature dimension information of preset categories corresponding to a target domain name, wherein the target domain name is any one of the M domain names; determining an individual score of each of the preset categories of the DNS system corresponding to the target domain name according to the plurality of pieces of normalized feature dimension information of the preset categories; and determining the total system score of the DNS system according to the cluster score of each of the preset categories of the DNS system, and the individual score of each of the preset categories of the DNS system.

Optionally the preset categories include maliciousness, popularity, and/or abnormality; and the determining the total system score of the DNS system according to the cluster score of each of the preset categories of the DNS system, and the individual score of each of the preset categories of the DNS system includes: determining a system score of the maliciousness of the DNS system according to a cluster score of the maliciousness of the DNS system, and an individual score of the maliciousness of the DNS system; determining a system score of the popularity of the DNS system according to a cluster score of the popularity of the DNS system, and an individual score of the popularity of the DNS system; determining a system score of the abnormality of the DNS system according to a cluster score of the abnormality of the DNS system, and an individual score of the abnormality of the DNS system; and determining the total system score of the DNS system according to the system score of the maliciousness, the system score of the popularity, and the system score of the abnormality of the DNS system.

In a second aspect, an embodiment of the invention provides an apparatus for evaluating DNS, the apparatus including:

a determining unit configured to determine M domain names in a DNS system, and a plurality of pieces of feature dimension information of each of preset categories corresponding to each of the M domain names according to a DNS traffic log, wherein M is an integer more than or equal to 1; to determine association identifier information associated with each of the M domain names, wherein the association identifier information includes an IP address and/or identity information; and to determine a cluster score of each of the preset categories of the DNS system according to association relationships between each of the M domain names and the association identifier information and further in view of the plurality of pieces of feature dimension information of each of preset categories corresponding to each of the M domain names, or according to attribute information of each of the M domain names and further in view of the plurality of pieces of feature dimension information of each of preset categories corresponding to each of the M domain names; and a scoring unit configured to determine a total system score of the DNS system according to the cluster score of each of the preset categories of the DNS system.

Optionally the association identifier information associated with each of the M domain names are grouped into a first entity element group, and N first entity element groups are obtained, wherein N is an integer more than or equal to 1, and less than or equal to M; and domain names with differences between their attribute information being below a preset attribute threshold among the M domain names, and the association identifier information associated with the domain names are grouped into a second entity element group, and K second entity element groups are obtained, wherein K is an integer more than or equal to 1. The scoring unit is configured: to determine first cluster scores of the preset categories of the DNS system according to the N first entity element groups and the feature dimension information; to determine second cluster scores of the preset categories of the DNS system according to the K second entity element groups and the feature dimension information; and to determine the cluster scores of the preset categories of the DNS system according to the first cluster scores of the preset categories, and the second cluster scores of the preset categories.

Optionally the scoring unit is configured: for each of the N first entity element groups, to normalize each of a plurality of pieces of feature dimension information corresponding to a target domain name in the first entity element group, wherein the target domain name is any one of the M domain names, to determine feature dimension information corresponding to the association identifier information in the first entity element group, and to determine the first cluster score of the DNS system according to each of the plurality of pieces of normalized feature dimension information corresponding to the target domain name in the first entity element group, and the feature dimension information corresponding to the association identifier information in the first entity element group; and for each of the K second entity element groups, to normalize each of a plurality of pieces of attribute information corresponding to the domain name in the second entity element group, to determine feature dimension information corresponding to the association identifier information in the second entity element group, and to determine the second cluster score of the DNS system according to each of the plurality of pieces of normalized attribute information corresponding to the domain name in the second entity element group, and the feature dimension information corresponding to the association identifier information in the second entity element group.

Optionally the scoring unit is configured: to normalize each of a plurality of pieces of feature dimension information of preset categories corresponding to a target domain name, wherein the target domain name is any one of the M domain names; to determine an individual score of each of the preset categories of the DNS system corresponding to the target domain name according to the plurality of pieces of normalized feature dimension information of the preset categories; and to determine the total system score of the DNS system according to the cluster score of each of the preset categories of the DNS system, and the individual score of each of the preset categories of the DNS system.

Optionally the preset categories include maliciousness, popularity, and/or abnormality; and the scoring unit is configured: to determine a system score of the maliciousness of the DNS system according to a cluster score of the maliciousness of the DNS system, and an individual score of the maliciousness of the DNS system; to determine a system score of the popularity of the DNS system according to a cluster score of the popularity of the DNS system, and an individual score of the popularity of the DNS system; to determine a system score of the abnormality of the DNS system according to a cluster score of the abnormality of the DNS system, and an individual score of the abnormality of the DNS system; and to determine the total system score of the DNS system according to the system score of the maliciousness, the system score of the popularity, and the system score of the abnormality of the DNS system.

In a third aspect, an embodiment of the invention provides an electronic device including: a processor, a memory, a bus interface, all of which are connected with each other over a bus, wherein the processor is configured to read program in the memory, and to execute the program: to determine M domain names in a DNS system, and a plurality of pieces of feature dimension information of each of preset categories corresponding to each of the M domain names according to a DNS traffic log, wherein M is an integer more than or equal to 1; to determine association identifier information associated with each of the M domain names, wherein the association identifier information includes an IP address and/or identity information; to determine a cluster score of each of the preset categories of the DNS system according to association relationships between each of the M domain names and the association identifier information and further in view of the plurality of pieces of feature dimension information of each of preset categories corresponding to each of the M domain names, or according to attribute information of each of the M domain names and further in view of the plurality of pieces of feature dimension information of each of preset categories corresponding to each of the M domain names; and to determine a total system score of the DNS system according to the cluster score of each of the preset categories of the DNS system; and the memory is configured to store one or more executable programs, and data for use by the processor to perform operations.

In a fourth aspect, an embodiment of the invention provides a non-transitory computer readable storage medium storing instructions that, when executed by a computer, cause the computer to perform the method according to the first aspect, or any one of the possible implementations of the first aspect.

In a fifth aspect, an embodiment of the invention provides a computer program product including instructions that, when executed by a computer, cause the computer to perform the method according to the first aspect, or any one of the possible implementations of the first aspect.

In the embodiments of the invention, the DNS system is evaluated according to the M domain names, and the plurality of pieces of feature dimension information of each of the preset categories corresponding to each of the M domain names, so the DNS can be evaluated using additional feature dimensions for evaluation to thereby improve the accuracy of evaluating the DNS; and furthermore the total system score of the DNS system can be determined according to the cluster scores of the respective preset categories of the DNS system to thereby further improve the accuracy of evaluating the DNS.

BRIEF DESCRIPTION OF THE DRAWINGS

In order to make the technical solutions according to the embodiments of the invention more apparent, the drawings to which reference is to be made in the description of the embodiments will be introduced below in brief.

DETAILED DESCRIPTION

In order to make the objects, technical solutions, and advantageous effects of the invention more apparent, the invention will be described below in further details with reference to the drawings and the embodiments thereof. It shall be noted that the specific embodiments described here are only intended to set forth the invention, but not to limit the invention thereto.

It shall be appreciated that the technical solutions according to the embodiments of the invention can be applicable to various communication systems, e.g., a Global System of Mobile Communication (GSM), a Code Division Multiple Access (CDMA) system, a Wideband Code Division Multiple Access (WCDMA) system, a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, a future 5G communication system, etc.

Figure 1:
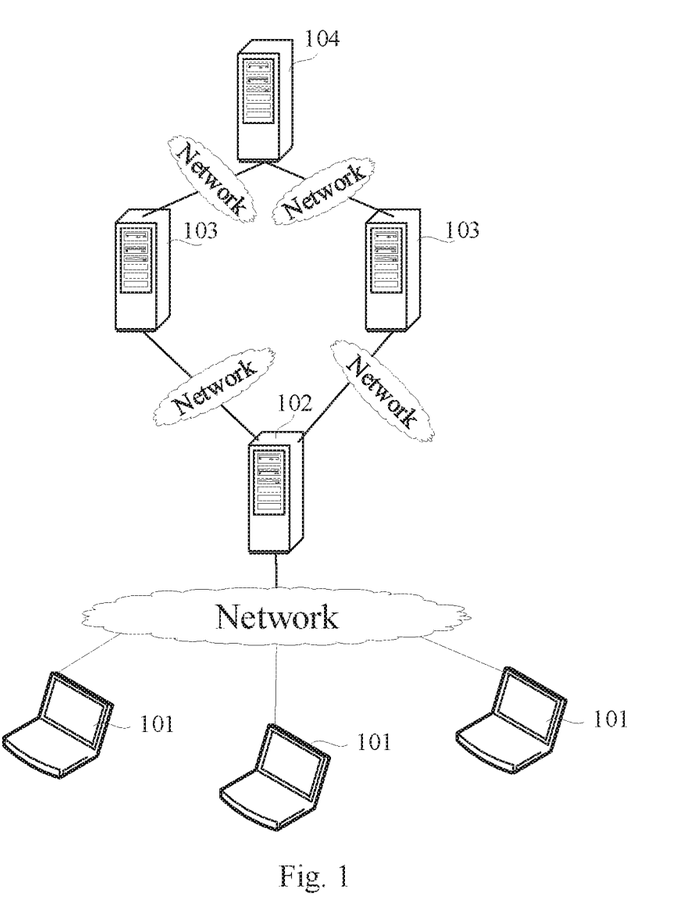
FIG. 1 is a schematic architectural diagram of a communication system according to an embodiment of the invention.

FIG. 1 illustrates a schematic architectural diagram of a communication system to which an embodiment of the invention is applicable. As illustrated in FIG. 1, the architecture of this system can include clients 101, a local domain name server 102, domain name servers 103, and a domain name server 104. The clients and the domain name servers are connected wirelessly, or in a wired manner, or otherwise.

Each client 101 is configured to receive a domain name parsing request input by a user, the client 101 transmits the received domain name parsing request to the local domain name server 102, and if the local domain name server 102 can parse the domain name, then the local domain name server 102 returns a result directly to the client; otherwise, the local domain name server 102 sends the domain name parsing request to an upper-level domain name server 103, and if the domain name server 103 can parse the domain name, then it sends a parsing result to the client; otherwise, it sends the domain name parsing request to the further upper-level domain name server 104, and so on until the domain name is parsed successfully for an IP address.

Each domain name server is configured to parse the received domain name parsing request, and each domain server includes all resource records in a DNS name space managed by the domain server, where a resource record is a domain-to-value binding and includes following fields: domain name, value, type, category, and Time to Live. The domain name field represents an object to be parsed, and the value field represents a returned parsing result. The type field represents the type of a value: the type A indicates that the value field is an IP address, i.e., a resulting answer desirable to a user; the type of a Name Server (NS) indicates the value field is a domain name of another domain name server which can know how to parse the domain name field for a specified domain name; the type of an alias record (CNAME) indicates that the value field is an alias of a host specified by the domain name; the type of a Mail Exchanger (MX) record indicates that the value field is a domain name of a mail server receiving mail(s) of a domain specified by the domain name field; and the type of a PTR indicates inverse parsing of a domain name etc. The category field allows another type of record to be specified. The time to live field indicates a validity time period of the resource record. In order to shorten a time period for parsing the domain name, the domain name server buffers some ever inquired resource records from other domain name servers. Since these resource records may be invalidated because they are changed, the domain name server sets Time to Live for a resource record, so that the resource record is cleared from the buffer if it expires.

Figure 2:
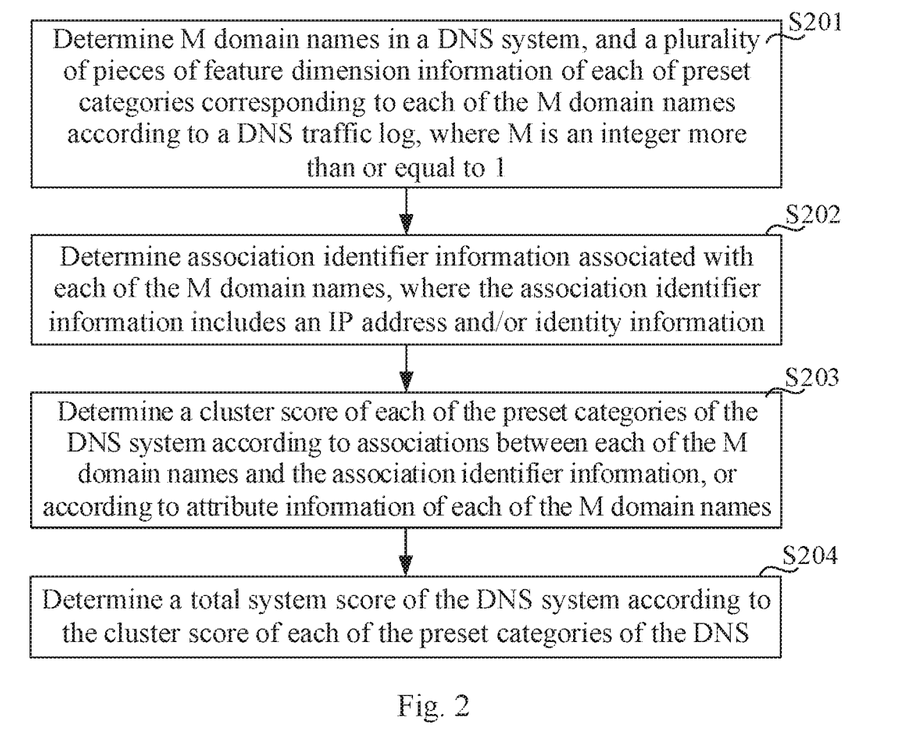
FIG. 2 is a schematic flow chart of a method for evaluating DNS according to an embodiment of the invention.

Base on the architecture of the system as illustrated in FIG. 1, FIG. 2 illustrates a schematic flow chart of a method for evaluating a DNS according to an embodiment of the invention. As illustrated in FIG. 2, the method for evaluating a DNS includes the following steps.

The step S201 is to determine, according to a DNS traffic log, M domain names in a DNS system, and a plurality of pieces of feature dimension information of each of preset categories corresponding to each of the M domain names, where M is an integer more than or equal to 1.

The step S202 is to determine association identifier information associated with each of the M domain names, where the association identifier information includes an IP address and/or identity information.

The step S203 is to determine a cluster score of each of the preset categories of the DNS system according to association relationships between each of the M domain names and the association identifier information, or according to attribute information of each of the M domain names, and further in view of the plurality of pieces of feature dimension information of each of preset categories corresponding to each of the M domain names.

The step S204 is to determine a total system score of the DNS system according to the cluster score of each of the preset categories of the DNS system.

In the embodiment of the invention, the DNS is evaluated according to the M domain names and the plurality of pieces of feature dimension information of each of the preset categories corresponding to each of the M domain names, so the DNS can be evaluated using additional feature dimensions for evaluation to thereby improve the accuracy of evaluating the DNS; and furthermore the total system score of the DNS system can be determined according to the cluster scores of the respective preset categories of the DNS system to thereby further improve the accuracy of evaluating the DNS.

Optionally in the embodiment of the invention, the DNS traffic log is obtained in a preset time length before the step S201. The DNS traffic log can include a parsing log of DNS request messages, and a parsing log of DNS reply messages. A DNS request message and a DNS reply message include five sections, i.e., a header section, a question section, an answer section, an authority section, and an additional section. The parsing log of DNS request messages, and the parsing log of DNS reply messages include DNS resource records, e.g., a host address (A) record, an AAAA record, an NS record, a CNAME record, etc., where the A record is a significant record for parsing a domain name, and maps a specific host name to an IP address of a corresponding host; the NS record specifies an authority name server responsible for the DNS area; and specifies DNS server parsing the domain name.

In the embodiment of the invention, after the DNS traffic log is obtained, data of the DNS traffic log is preprocessed, which can include filtering out useless and invalid DNS traffic log records. For example, domain names appearing frequently in intranet DNS records, domain names for exchanging intranet host names, etc., e.g., the domain names ending with the character "localhost", "bogon.", "arpa.", "localdom.", etc. Such domain names appear in an intranet, and does not relate to any behavior over the Internet. Domain names in a white list (which are typically possessed by large institutions and organizations, accessed by a large number of clients, highly secured, and thus infrequently abnormal, e.g., a home domain name in AlexaTop 100M, e.g., baidu.com, google.com, qq.com, etc.), etc., are filtered out. The data of the DNS traffic log can be preprocessed to thereby obtain a valid DNS traffic log and reduce the amount of data to be processed.

Optionally in the embodiment of the invention, the M domain names in the DNS system are determined according to the DNS traffic log, where the M domain names can include a single domain name, a set of domain names clustered under some rule, and a set of domain names including a specific character. The plurality of pieces of feature dimension information of each of the preset categories corresponding to each of the M domain names are determined, where the plurality of feature dimensions include: a domain name length, statistics of Time To Live (TTL), e.g., the maximum value of the TTL, the minimum value of the TTL, the average of the TTL, the variance of the TTL, etc.; a domain name level number; a request transmission time interval; the number of requesting client IP address; a response state; the number of parsed IP addresses corresponding to a domain name; a null domain name periodicity; the number of parsed IP addresses; an initially occurrence time; an access periodicity; domain name character features, e.g., the number of dissimilar vowels, the number of dissimilar consonants, a frequency at which vowels and consonants alternate; the number of digits; a domain name subject feature, e.g., domain name subject is telecommunication, news, a portal, game, etc.; a client access region feature, e.g., a nation, a longitude and a latitude, a province or a city, etc.; an access frequency; statistical features of accesses of clients to domain names which are null as a result of parsing, e.g., the number of requests, the number of dissimilar domain names, an access periodicity, an access frequency, etc.

Optionally in the embodiment of the invention, the determining a cluster score of each of the preset categories of the DNS system according to association relationships between each of the M domain names and the association identifier information, or according to attribute information of each of the M domain names, and further in view of the plurality of pieces of feature dimension information of each of preset categories corresponding to each of the M domain names includes: grouping the association identifier information associated with each of the M domain names into a first entity element group, and obtaining N first entity element groups; determining first cluster scores of the preset categories of the DNS system according to the N first entity element groups and the feature dimension information; grouping domain names with the differences between their attribute information being below a preset attribute threshold among the M domain names, and the association identifier information associated with the domain names into a second entity element group, and obtaining K second entity element groups; determining second cluster scores of the preset categories of the DNS system according to the K second entity element groups and the feature dimension information; and determining the cluster scores of the preset categories of the DNS system according to the first cluster scores of the preset categories and the second cluster scores of the preset categories.

Optionally in the embodiment of the invention, each of the M domain names, and the association identifier information are determined, where the association identifier information associated with each domain name can be a client IP address, a parsed IP address, identity information, etc.; the association relationships between each domain name and the association identifier information can include: an association relationship between the client IP address and the domain name, an association relationship between the domain name and the identity information, an association relationship between the domain name and the parsed IP address, an association relationship between the client IP address and a DNS server IP address, etc.; and the association relationships can be obtained from the DNS traffic log and an identity information base. Specifically the association relationship between the domain name and the identity information is an association relationship formed by determining the client IP and the domain name according to QNAME in a question section in a DNS request message, or NAME in an answer section in a DNS reply message; the association relationship between the domain name and the parsed IP address is an association relationship obtained according to Resource Records (RRs) in an answer section, an authority section, and an additional section in a DNS reply message; the association relationship between the client IP and the DNS server IP is an association relationship obtained according to UDP header sections in a DNS request message and a DNS reply message; and the association relationship between the domain name and the identity information is obtained from the identity information base, where the identity information can be who is information which can be used to inquire about whether the domain name has been registered, and detailed information about the registered domain name, e.g., a domain name holder, a domain name registrant, etc., and the identity information can include Registrant Name, Registrant Organization, Registrant Email, Admin Name, Admin Organization, Admin Email, etc. In the embodiment of the invention, the DNS can be evaluated based upon both the DNS traffic log and the real identity information as additional real criterions for evaluating the DNS, so that a result of evaluating the DNS can be more accurate and practical. Furthermore grouping can be made according to their association relationships and attribute information to thereby lower a workload of manual analyses and searches, and grouping can be made according to the association relationships to thereby identify a cluster feature of domain name associations.

Optionally in the embodiment of the invention, the association identifier information associated with each of the M domain names is grouped into a first entity element group specifically in the following implementation.

A knowledge graph is created according to the four association relationships between each of the M domain names and the association identifier information, and the created knowledge graph can be represented as G (V, E), where V represents a node in the knowledge graph, and E represents an edge in the knowledge graph. $V=\{v_i$ (ID, Value, Type, Additional Attribute of the node)$\}$, where $v_i$ represents any one node in the knowledge graph, and ID represents a unique number allocated for the node in the knowledge graph, where a node may belong to a plurality of sets. $E=\{e_i$ (Source Node, Target Node, Type, Attribute Set of the edge)$\}$, where $e_i$ represents any one edge in the knowledge graph. Any one node $v_i$ in the knowledge graph represents any one entity element among the four association relationships, and each node in the knowledge graph includes two default attributes: the type of the entity element, and a value corresponding to the entity element. Specifically the type of the entity element can include a domain name, a client IP address, a DNS server IP address, a parsed IP address, and identity information; and the value is a value corresponding to a different type of entity element, and for example, the node corresponds to the domain name baidu.com (Type=Domain Name, Value=baidu.com), and in another example, the IP address of a free DNS server powered by Google is 8.8.8.8, then Type=Domain Name Server, Value=8.8.8.8. An edge in the knowledge graph represents an association relationship between entity element nodes, and related attribute information of the edge, where the related attribute information includes Type: Domain Name→IP Address; Client→Domain Name; Client→DNS Server; Domain Name→Identity Information; Time Span Information, where if, for example, a DNS request of a client to baidu.com is made between 12:00 and 14:00 someday, then the Time Span Information is 12:00 to 14:00; an initial occurrence time; an occurrence frequency; number of occurrences; etc.

A method for creating a knowledge graph will be described by way of a specific example. For example, in a DNS traffic log obtained in a preset time length, all the parsing results between 2016.10.17. 23:00 to 2016.10.18. 09:00 with a domain name of baidu.com include a parsed IP address of 220.181.57.217; the number of occurrences is 1000; and the occurrence frequency is 10, so nodes V in a knowledge graph created according to the DNS traffic log include: $v_i$ (Type=Domain Name, Value=baidu.com), and $v_2$ (Type=Domain Name Server, Value=8.8.8.8), and an edge E in the knowledge graph is $e_i$ (Type=Domain Name→IP Address, Start Time=2016.10.17 23:00, End Time=2016.10.18 09:00, Number of Occurrences=1000, Occurrence Frequency=10).

Optionally the association identifier information associated with each of the M domain names is grouped into a first entity element group. In an implementation of the embodiment of the invention, the association identifier information is grouped according to the created knowledge graph; and a node in the knowledge graph represents an entity element in an association relationship, and the types of the node generally include three types: domain name, IP address, and identity information, so the association identifier information can be grouped into the first entity element group in three combinations: a domain name and an IP address, a domain name and identity information, and a domain name, an IP address, and identity information. A group of a domain name and an IP address represents an association relationship between the entity elements including the domain name and the IP address in the group, a group of a domain name and identity information represents an association relationship between the entity elements including the domain name and the identity information, and a group of a domain name, an IP address, and identity information represents association relationships between every two of the entity elements including the domain name, the IP address, and the identity information. The entity elements can be clustered based on the association relationships.

Optionally the association identifier information associated with each of the M domain names is grouped into a first entity element group in the following optional implementation of the embodiment of the invention.

For example, domain names, IP addresses, and email boxes are to be aggregated.

Firstly initial (node/edge) filtering conditions are defined: the initial filtering condition of a node $v_i$ is that Type=Domain Name or Type=IP Address or Type=Email Box, and the initial filtering condition of an edge $e_i$ is that Type=Domain Name→IP Address or Domain Name→E-mail Box; and a parsing type of the DNS is defined as Parsed Type=A or Parsed Type=AAAA, so the knowledge graph can be filtered according to the two initial filtering conditions defined above to obtain a sub-graph including the entity elements: the domain name, the IP address, and the email box, and association relationships between them.

Figure 3:
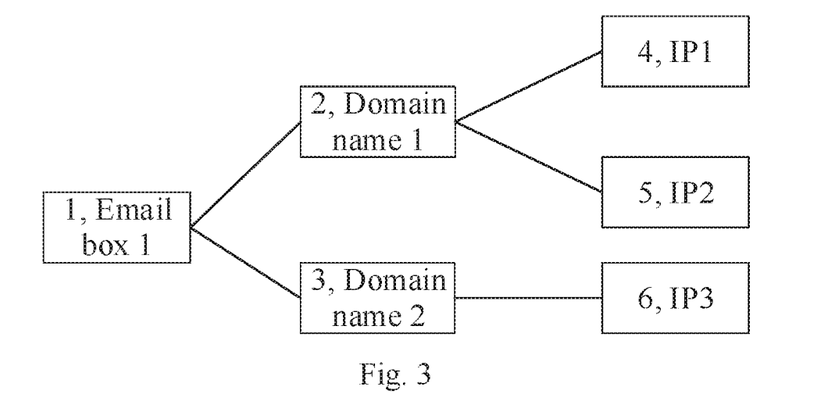
FIG. 3 is a schematic diagram of association relationships of domain names, IP addresses, and email boxes according to an embodiment of the invention.

For the sake of a convenient description, FIG. 3 illustrates a sub-graph including domain names, IP addresses, and an email box, and association relationships between them. As illustrated in FIGS. 3, 1, 2, 3, 4, 5, and 6 followed by ",", represent the IDs of corresponding nodes in the sub-graph, and the IDs are allocated unique numbers identifying the corresponding nodes. For example, in "1, Email Box 1", "1" followed by "," represents the ID of this node in the sub-graph, and the ID is a unique number allocated for this node; and "Email Box 1" identifies an node in the sub-graph. The groups are created for the created sub-graph including the domain name, the IP address, and the email box, and the association relationships between them. Optionally in the embodiment of the invention, the groups can be created by joining a plurality of tables, or using the GraphX suit or the GraphLab library in Spark.

In the embodiment of the invention, the groups are specifically created by joining a plurality of tables by way of an example, and in the sub-graph as illustrated in FIG. 3, two tables can be created respectively using the association relationship between the domain name and the email box, and the association relationship between the domain name and the IP address: the association relationship between the domain name and the email box is represented as Table A, and the association relationship between the domain name and the IP address is represented as Table B.

TABLE A

The association relationship between the domain name and the email box

| Domain name | Email box | Domain name ID | Email box ID |
|---|---|---|---|
| Domain name 1 | Email box 1 | 2 | 1 |
| Domain name 2 | Email box 1 | 3 | 1 |

TABLE B

The association relationship between the domain name and the IP address

| Domain name | IP address | Domain name ID | IPID |
|---|---|---|---|
| Domain name 1 | IP address 1 | 2 | 4 |
| Domain name 2 | IP address 3 | 3 | 6 |
| Domain name 1 | IP address 2 | 2 | 5 |

In Table A and Table B, the domain name ID represents a globally unique number of the domain name in the sub-graph, the email box ID represents a globally unique number of the email box in the sub-graph, and the IPID represents a globally unique number of the IP address in the sub-graph.

Table A and Table B are right-joined into Table C using the domain name as a primary key.

TABLE C

The table into which Table A and Table B are right-joined using the domain name as a primary key

| Domain name | Email box | IP address | Domain name ID | Email box ID | IPID |
|---|---|---|---|---|---|
| Domain name 1 | Email box 1 | IP address 1 | 2 | 1 | 4 |
| Domain name 1 | Email box 1 | IP address 2 | 2 | 1 | 5 |
| Domain name 2 | Email box 1 | IP address 3 | 3 | 1 | 6 |

The groups can be created based on Table C, and there may be three grouping schemes, which are $Group_{domain\ name\ \&\ IP\ address}$, $Group_{domain\ name\ \&\ email\ box}$, and $Group_{domain\ name\ \&\ email\ box\ \&\ IP}$ address respectively.

Taking $Group_{domain\ name\ \&\ IP\ address}$ as an example, IP addresses with the same domain name are grouped into a first entity element group, and after grouping, the group is identified using the minimum value of the domain name ID and the IPID as an identifier, i.e., $Group_{domain\ name\ \&\ IP\ address}$=MIN (Domain Name ID, IPID). By way of an example, in Table C, the domain name 1 corresponds to an IP address 1 and an IP address 2, and the IP addresses (the IP address 1 and the IP address 2) with the same domain name (the domain name 1) are grouped into a group {2, Domain Name 1; 4, IP1 Address; 5, IP Address 2}. Optionally the identifier $Group_{domain\ name\ \&\ IP\ address}$ is determined as MIN (Domain Name ID, IPID), where firstly the minimum value of the domain name IDs (2, 2) and the IPIDs (4, 5) corresponding to the IP addresses (the IP address 1 and the IP address 2) is determined as 2, so the identifier of this group is 2, i.e., $Group_{domain\ name\ \&\ IP\ address}$ (2), that is, an IP address group with the same domain name is determined as $Group_{domain\ name\ \&\ IP\ address}$ (2)={2, Domain Name 1; 4, IP Address 1; 5, IP Address 2}, and $Group_{domain\ name\ \&\ IP\ address}$ (3)={3, Domain Name 2; 6, IP3}.

Alike a first entity element group can be created using the domain name and the email box, that is, email boxes with the same domain name can be grouped, and Group$_{domain\ name\ \&\ email\ box}$ (1)={2, Domain Name 1: 1, Email Box 1}, and Group$_{domain\ name\ \&\ email\ box}$ (1)={3, Domain Name 2: 1, Email Box 1} can be determined according to the sub-graph. A first entity element group can be created as Group$_{domain\ name\ \&\ email\ box\ \&\ IP\ address}$ using the domain name, the email box, and the IP address, that is, an email box and an IP address with the same domain name can be grouped into a group, where the domain name was ever connected with both the email box and the IP address. Group$_{domain\ name\ \&\ email\ box\ \&\ IP\ address}$ (1)={2, Domain Name 1; 1, Email Box 1; 4, IP Address 1; 5, IP Address 2}, and Group$_{domain\ name\ \&\ email\ box\ \&\ IP\ address}$ (1)={2, Domain Name 2: 1, Email Box 1; 6, IP Address 3} can be determined according to the sub-graph.

Optionally in the embodiment of the invention, domain names with the differences between their attribute information being below a preset attribute threshold among the M domain names, and the association identifier information associated with the domain names are grouped into a second entity element group, and K second entity element groups are obtained.

Optionally in the embodiment of the invention, attribute information of each of the M domain names can be grouped, and one or more of the attribute information can be grouped. The attribute information of each of the M domain names includes: the number of parsed IP addresses; an initial occurrence time; an access periodicity; domain name character features, e.g., the number of dissimilar vowels, the number of dissimilar consonants, a legibility factor, a frequency at which vowels and consonants alternate; the number of digits; a domain name subject feature, e.g., telecommunication, news, a portal, game, etc.; a client access region feature, e.g., a nation, a longitude and a latitude, a province or a city, etc.; an access frequency; statistical features of accesses of clients to domain names which are null as a result of parsing, e.g., the number of requests, the number of dissimilar domain names, an access periodicity, an access frequency, a time span for parsing, etc. Eigenvectors can be generated according to the different attribute information or combinations of attribute information; and thereafter the attribute information or combinations of attribute information can be normalized, and then grouped using Xmeans/Kmeans or another clustering algorithmic, and a globally unique label is allocated to each second entity element group into which the attribute information is grouped. By way of an example, combinations of attribute information of domain names, i.e., accesses of clients to the domain names, are grouped into a group 1={Client 1 accesses Domain Name 1; Client 1 accesses Domain Name 3}, and a group 2={Client 1 accesses Domain Name 2}, so a set of group labels of the client 1 is {Group 1, Group 2}, a set of group labels of the domain name 1 is {Group 1}, a set of group labels of the domain name 2 is {Group 2}, and a set of group labels of the domain name 3 is {Group 1}, that is, if the domain names are grouped, then each domain name may belong to a second entity element, so the label of the group is the group label of the domain name.

Optionally the determining the first cluster score of the DNS system according to the N first entity element groups and the feature dimension information includes: for each of the N first entity element groups, normalizing each of a plurality of pieces of feature dimension information corresponding to a target domain name in the first entity element group, determining feature dimension information corresponding to the association identifier information in the first entity element group, where the target domain name is any one of the M domain names, and determining the first cluster score of the DNS system according to each of the plurality of pieces of normalized feature dimension information corresponding to the target domain name in the first entity element group, and the feature dimension information corresponding to the association identifier information in the first entity element group; and the determining the second cluster score of the DNS system according to the K second entity element groups and the feature dimension information includes: for each of the K second entity element groups, normalizing each of a plurality of pieces of attribute information corresponding to the domain name in the second entity element group, determining feature dimension information corresponding to the association identifier information in the second entity element group, and determining the second cluster score of the DNS system according to each of the plurality of pieces of normalized attribute information corresponding to the domain name in the second entity element group, and the feature dimension information corresponding to the association identifier information in the second entity element group.

In the embodiment of the invention, for each of the N first entity element groups, each of the plurality of pieces of feature dimension information corresponding to the domain name in the first entity element group is normalized. Optionally the normalizing includes: determining the maximum value and the minimum value of the plurality of pieces of feature dimension information in each first entity element group, and normalizing each piece of feature dimension information in each first entity element group in Equation (1) of:

$$\chi' = \frac{\chi - \min}{\max - \min} \qquad \text{Equation (1)}$$

Where $\chi'$ represents the normalized feature dimension information, $\chi$ represents the current feature dimension information, min represents the minimum value of the feature dimension information in the group, and max represents the maximum value of the feature dimension information in the group.

The determining the feature dimension information corresponding to the association identifier information in each first entity element group includes: determining feature dimension information corresponding to the IP address and/or the identity information, where the feature dimension information of the association identifier information is obtained from an external threat information database, and for example, the feature dimension information of the IP address can be stored in the threat information database upon user feedback, and the feature dimension information of the corresponding IP address can be flagged in the external threat information database according to a result of making a statistic of user feedback, where the flag can be represented as 0 representing a secured IP address, or 1 representing a risky IP address. The feature dimension information corresponding to the identity information can be obtained from an identity information database.

The first cluster score of the DNS system is determined according to each of the plurality of normalized feature dimension information corresponding to the domain name in the first entity element group. Optionally in the embodiment of the invention, the determining the first cluster score of the DNS system includes: determining a first cluster score of each first entity element group according to each of the plurality of pieces of normalized feature dimension information corresponding to the domain name in the first entity element group, the feature dimension information corresponding to the association identifier information in the first entity element group, and a preset descending order, from high to low, of the feature dimension information in Equation (2) below, where the descending order, from high to low, of the plurality of pieces of feature dimension information in each of the preset categories is determined according to their importance factors:

$$m_g = m_1 + \sum_{i=2}^{n}\left[\left(1 - \sum_{j=1}^{i-1} m_j\right) * \frac{m_i}{i}\right] \quad \text{Equation (2)}$$

In Equation (2), $m_g$ represents the first cluster score of the first entity element group; $m_1$, $m_i$, and $m_j$ represent the normalized feature dimension information of the plurality of feature dimensions in a descending order, from high to low, of the plurality of pieces of feature dimension information corresponding to each of the preset categories, where $m_1$ represents the highest one of the plurality of feature dimensions, and $m_i$, and $m_j$ represent any one of the plurality of feature dimensions; and n represents the total number of pieces of feature dimension information.

The highest one of the determined first cluster scores of the respective ones of the N first entity element groups is determined as the first cluster score of the DNS system.

In the embodiment of the invention, the determining the second cluster score of the DNS system according to the K second entity element groups includes: for each of the K second entity element groups, normalizing each of a plurality of pieces of attribute information corresponding to the domain name in the second entity element group. Optionally in the embodiment of the invention, the normalizing the attribute information includes: determining the maximum value and the minimum value of the plurality of pieces of attribute information in each second entity element group, and for each piece of attribute information in each of the K second entity element groups, normalizing each piece of attribute information in each second entity element group in Equation (1).

The determining the feature dimension information corresponding to the association identifier information in each second entity element group includes: determining feature dimension information corresponding to the IP address and/or the identity information, where the feature dimension information of the association identifier information is obtained from an external threat information database, and for example, the feature dimension information of the IP address can be stored in the threat information database upon user feedback, and the feature dimension information of the corresponding IP address can be flagged in the external threat information database according to a result of making a statistic of user feedback, where the flag can be represented as 0 representing a secured IP address, or 1 representing a risky IP address. The feature dimension information corresponding to the identity information can be obtained from an identity information database. The second cluster score of the DNS system is determined according to each of the plurality of pieces of normalized attribute information corresponding to the domain name in the second entity element group, and the feature dimension information corresponding to the association identifier information in the second entity element group. Optionally in the embodiment of the invention, the determining the second cluster score of the DNS system includes: determining a second cluster score of each second entity element group according to each of the plurality of pieces of normalized attribute information corresponding to the domain name in the second entity element group, the feature dimension information corresponding to the association identifier information in the cluster score entity element group, and a preset descending order from high to low of the respective feature dimension information in Equation (2), where the descending order from high to low of the plurality of pieces of feature dimension information in each of the preset categories is determined according to their importance factors.

The highest one of the determined second cluster scores of the K second entity element groups is determined as the second cluster score of the DNS system.

Optionally in the embodiment of the invention, the higher one of the first cluster score of the DNS system, and the second cluster score of the DNS system is determined as a cluster score of the DNS system.

Optionally the determining the total system score of the DNS system according to the cluster scores of the preset categories of the DNS system includes: normalizing each of a plurality of pieces of feature dimension information of preset categories corresponding to a target domain name, where the target domain name is any one of the M domain names; determining individual scores of the preset categories of the DNS system corresponding to the target domain name according to the plurality of pieces of normalized feature dimension information of the preset categories; and determining the total system score of the DNS system according to the cluster scores of the preset categories of the DNS system, and the individual scores of the preset categories of the DNS system.

Optionally in the embodiment of the invention, each of a plurality of pieces of feature dimension information of preset categories corresponding to each target domain name among a plurality of domain names can be normalized in another method, and taking normalization of a plurality of pieces of feature dimension information corresponding to a preset category as an example, a plurality of pieces of feature dimension information corresponding to one of the preset categories are {a=2.5, b=3.5, c=0.5, d=1.5}, for example, and the four pieces of feature dimension information is normalized as follows.

The four pieces of feature dimension information are summed, that is, 2.5+3.5+0.5+1.5=8; the ratio of each piece of feature dimension information to the sum of the four pieces of feature dimension information is determined, that is, 2.5/8=0.3125, 3.5/8=0.4375, 0.5/8=0.0625, and 1.5/8=0.1875, so the four pieces of normalized feature dimension information are {a=0.3125, b=0.4375, c=0.0625, d=0.1875}; and the individual score of the preset category of the DNS system is determined according to the respective pieces of preset feature dimension information in a descending order from high to low and Equation (3) of:

$$m_d = m_1 + \sum_{i=2}^{n}\left[\left(1 - \sum_{j=1}^{i-1} m_j\right) * \frac{m_i}{i}\right] \quad \text{Equation (3)}$$

In Equation (3), $m_d$ represents the individual score, $m_1$, $m_i$, and $m_j$ represent the normalized feature dimension information of the plurality of feature dimensions in a descending order from high to low, of the plurality of pieces of feature dimension information corresponding to each of the preset categories, where $m_1$ represents the highest one of the plurality of feature dimensions, and $m_i$, and $m_j$ represent any one of the plurality of feature dimensions; and n represents the total number of pieces of feature dimension information.

Optionally if it is determined that an individual score of a preset category of the DNS system relates to a target domain name, then a statistic may be made of domain names associated with the domain name, and/or feature dimension information of associations associated with the domain name, the statistic feature dimension information may be normalized, and the individual score of the preset category of the DNS system may be determined according to the respective feature dimension information in a descending order from high to low and Equation (3). Optionally while the individual score of the preset category of the DNS system is being determined, since the feature dimension information of the associations is obtained from the external threat information database, and an information source of the external threat information database may different with an evaluation criterion, a feature dimension of an association may correspond to a plurality of pieces of information, that is, a feature dimension may correspond to a plurality of values, and at this time, the median or the average of all the information of this feature dimension shall be determined as feature dimension information of the feature dimension.

Optionally in the embodiment of the invention, the total system score of the DNS system determined according to the cluster scores of the respective preset categories of the DNS system, and the individual score of each of the preset categories of the DNS system in Equation (4) of:

$$m = m_g + \alpha m_d \quad \text{Equation (4)}$$

In Equation (4), m represents the total system score of the DNS system, $m_g$ represents the cluster score of each category, $m_d$ represents the individual score of each category, and $\alpha$ represents any number.

Optionally the preset categories include maliciousness, popularity, and/or abnormality; and the determining the total system score of the DNS system according to the cluster scores of the respective preset categories of the DNS system, and the individual score of each of the preset categories of the DNS system includes: determining a system score of the maliciousness of the DNS system according to a cluster score of the maliciousness of the DNS system, and an individual score of the maliciousness of the DNS system; determining a system score of the popularity of the DNS system according to a cluster score of the popularity of the DNS, and an individual score of the popularity of the DNS system; determining a system score of the abnormality of the DNS system according to a cluster score of the abnormality of the DNS system, and an individual score of the abnormality of the DNS system; and determining the total system score of the DNS system according to the system score of the maliciousness, the system score of the popularity, and the system score of the abnormality of the DNS system.

Optionally in the embodiment of the invention, the preset categories include maliciousness, popularity, and/or abnormality, where feature dimensions of the maliciousness can include: a domain name length, Time To Live (TTL), the number of domain name levels, a transmission time interval of a request, the number of IP addresses of requesting clients, a response state, the number of IP addresses corresponding to a domain name, a null domain name periodicity, maliciousness of an IP address, and maliciousness of identity information. Feature dimensions of the popularity can include: the number of DNS requests, the number of IP addresses of different requesting clients, the number of domain names in a same cluster, the number of domain names target tracking (TLD) in a same cluster, the number of regions of different requesting clients, maliciousness of an IP address, and maliciousness of identity information; and the feature dimension information of the popularity is obtained by making a statistic of the obtained DNS traffic log, the identity information database, and the threat information database. The feature dimensions of the abnormality can include: the abnormal number of requests with the same domain name, the abnormal number of different sub-domain names with the same domain name, the abnormal number of parsed IP addresses, an abnormal domain name to which the same IP address is directed, maliciousness of an IP address, and maliciousness of identity information; and the feature dimension information of the popularity is obtained by making a statistic of the obtained DNS traffic log, the identity information database, and the threat information database, where the maliciousness of an IP address, and a maliciousness of identity information are obtained from the threat information database and the identity information database.

Optionally in the embodiment of the invention, the DNS system is evaluated for any one or more of three preset categories of maliciousness, popularity, and abnormality. The DNS system can be evaluated for a plurality of preset categories by determining the total system score of the DNS system as a weighted sum of a system score of the maliciousness, a system score of the popularity, and a system score of the abnormality of the DNS system. In this way, the accuracy of evaluating the DNS system can be further improved.

The DNS system is evaluated according to the M domain names, and the plurality of pieces of feature dimension information of each of the preset categories corresponding to each of the M domain names, so the DNS can be evaluated using additional feature dimensions for evaluation to thereby improve the accuracy of evaluating the DNS; and furthermore the total system score of the DNS system can be determined according to the cluster scores of the respective preset categories of the DNS system to thereby further improve the accuracy of evaluating the DNS.

Figure 4:
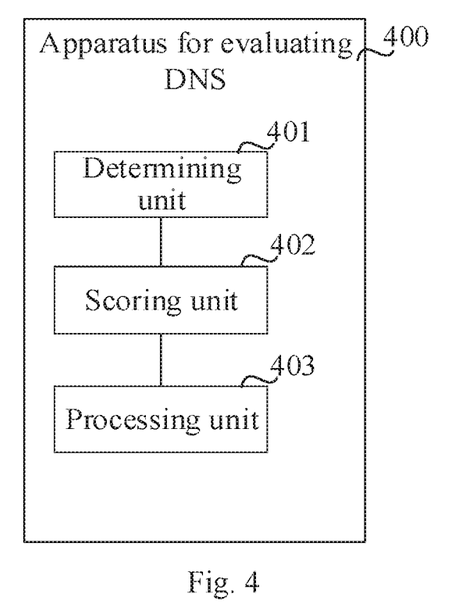
FIG. 4 is a schematic structural diagram of an apparatus for evaluating DNS according to an embodiment of the invention.

FIG. 4 illustrates a schematic structural diagram of an apparatus for evaluating DNS according to an embodiment of the invention.

Based upon the same inventive idea, an embodiment of the invention provides an apparatus for evaluating DNS. As illustrated in FIG. 4, the apparatus 400 for evaluating DNS includes a determining unit 401, a scoring unit 420, and also a processing unit 403.

The determining unit is configured to determine M domain names in a DNS system, and a plurality of pieces of feature dimension information of each of preset categories corresponding to each of the M domain names according to a DNS traffic log, where M is an integer more than or equal to 1; to determine association identifier information associated with each of the M domain names, where the association identifier information includes an IP address and/or identity information; and to determine a cluster score of each of the preset categories of the DNS system according to association relationships between each of the M domain names and the association identifier information and further in view of the plurality of pieces of feature dimension information of each of preset categories corresponding to each of the M domain names, or according to attribute information of each of the M domain names and further in view of the plurality of pieces of feature dimension information of each of preset categories corresponding to each of the M domain names; and the scoring unit is configured to determine a total system score of the DNS system according to the cluster score of each of the preset categories of the DNS system.

Optionally the apparatus further includes the processing unit configured: to group the association identifier information associated with each of the M domain names into a first entity element group, and to obtain N first entity element groups, where N is an integer more than or equal to 1, and less than or equal to M; and to group domain names with differences between their attribute information being below a preset attribute threshold among the M domain names, and the association identifier information associated with the domain names into a second entity element group, and to obtain K second entity element groups, where K is an integer more than or equal to 1.

The scoring unit is configured: to determine first cluster scores of the preset categories of the DNS system according to the N first entity element groups and the feature dimension information; to determine second cluster scores of the preset categories of the DNS system according to the K second entity element groups and the feature dimension information; and to determine the cluster scores of the preset categories of the DNS system according to the first cluster scores of the preset categories, and the second cluster scores of the preset categories.

Optionally the scoring unit is configured: for each of the N first entity element groups, to normalize each of a plurality of pieces of feature dimension information corresponding to a target domain name in the first entity element group, where the target domain name is any one of the M domain names, to determine feature dimension information corresponding to the association identifier information in the first entity element group, and to determine the first cluster score of the DNS system according to each of the plurality of pieces of normalized feature dimension information corresponding to the target domain name in the first entity element group, and the feature dimension information corresponding to the association identifier information in the first entity element group; and for each of the K second entity element groups, to normalize each of a plurality of pieces of attribute information corresponding to the domain name in the second entity element group, to determine feature dimension information corresponding to the association identifier information in the second entity element group, and to determine the second cluster score of the DNS system according to each of the plurality of pieces of normalized attribute information corresponding to the domain name in the second entity element group, and the feature dimension information corresponding to the association identifier information in the second entity element group.

Optionally the scoring unit is configured: to normalize each of a plurality of pieces of feature dimension information of preset categories corresponding to a target domain name, where the target domain name is any one of the M domain names; to determine an individual score of each of the preset categories of the DNS system corresponding to the target domain name according to the plurality of pieces of normalized feature dimension information of the preset categories; and to determine the total system score of the DNS system according to the cluster score of each of the preset categories of the DNS system, and the individual score of each of the preset categories of the DNS system.

Optionally the preset categories include maliciousness, popularity, and/or abnormality; and the scoring unit is configured: to determine a system score of the maliciousness of the DNS system according to a cluster score of the maliciousness of the DNS system, and an individual score of the maliciousness of the DNS system; to determine a system score of the popularity of the DNS system according to a cluster score of the popularity of the DNS system, and an individual score of the popularity of the DNS system; to determine a system score of the abnormality of the DNS system according to a cluster score of the abnormality of the DNS system, and an individual score of the abnormality of the DNS system; and to determine the total system score of the DNS system according to the system score of the maliciousness, the system score of the popularity, and the system score of the abnormality of the DNS system.

As can be apparent from the disclosure above, in the embodiment of the invention, the DNS system is evaluated according to the M domain names, and the plurality of pieces of feature dimension information of each of the preset categories corresponding to each of the M domain names, so the DNS can be evaluated using additional feature dimensions for evaluation to thereby improve the accuracy of evaluating the DNS; and furthermore the total system score of the DNS system can be determined according to the cluster scores of the respective preset categories of the DNS system to thereby further improve the accuracy of evaluating the DNS.

Figure 5:
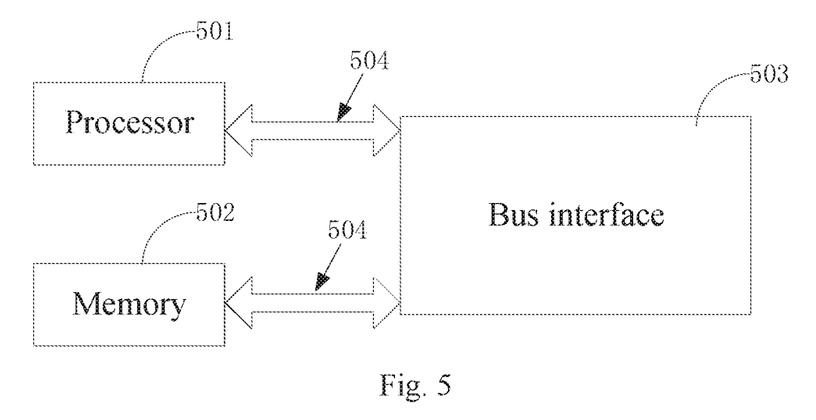
FIG. 5 is a schematic structural diagram of an electronic device according to an embodiment of the invention.

Based upon the same inventive idea, an embodiment of the invention provides an electronic apparatus for performing the flow of the method above performed by a backend system. FIG. 5 is a schematic structural diagram of an electronic device according to an embodiment of the invention. The electronic device includes: a processor 501, a memory 502, and a bus interface 503, where the processor 501, the memory 502, and the bus interface 503 are connected with each other over a bus 504.

The memory 502 is configured to store program, and specifically the program can include program codes including computer operation instructions. The memory 502 can include a volatile memory, e.g., a Random Access Memory (RAM), a nonvolatile memory, e.g., a flash memory, a Hard Disk Driver (HDD), or a Solid State Driver (SSD), or their combination.

The memory 502 stores the following elements, executable modules or data structures, or their subsets or extended sets.

Operation instructions include various operation instructions for performing various operations.

An operating system includes various system program for providing various underlying services, and performing hardware based tasks.

The bus 504 can be a Peripheral Component Interconnect (PCI) bus, an Extended Industry Standard Architecture (EISA) bus, etc. The bus can be an address bus, a data bus, a control bus, etc. For the sake of a convenient illustration, FIG. 5 only illustrates the bus in a solid line, but this shall not suggest only one bus or one kind of bus.

The bus interface 503 can be a wired communication interface, a wireless communication interface, or their combination, where the wired communication interface can be an Ethernet interface, for example. The Ethernet interface can be an optical interface, an electrical interface, or their combination. The wireless communication interface can be a WLAN interface.

The processor 501 can be a Central Processing Unit (CPU), a Network Processor (NP), or their combination, or can be a hardware chip. The hardware chip can be an Application-Specific Integrated Circuit (ASIC), a Programmable Logic Device (PLD), or their combination. The PLD can be a Complex Programmable Logic Device (CPLD), a Field Programmable Gate Array (FPGA), a Generic Array Logic (GAL), or any combination thereof.

The processor 501 is configured to read the program in the memory 502, and to execute the program: to determine M domain names in a DNS system, and a plurality of pieces of feature dimension information of each of preset categories corresponding to each of the M domain names according to a DNS traffic log, where M is an integer more than or equal to 1; to determine association identifier information associated with each of the M domain names, where the association identifier information includes an IP address and/or identity information; to determine a cluster score of each of the preset categories of the DNS system according to association relationships between each of the M domain names and the association identifier information and further in view of the plurality of pieces of feature dimension information of each of preset categories corresponding to each of the M domain names, or according to attribute information of each of the M domain names and further in view of the plurality of pieces of feature dimension information of each of preset categories corresponding to each of the M domain names; and to determine a total system score of the DNS system according to the cluster score of each of the preset categories of the DNS system.

The memory 502 is configured to store one or more executable programs, and data for use by the processor 501 to perform operations.

Optionally the processor is configured: to group the association identifier information associated with each of the M domain names into a first entity element group, and to obtain N first entity element groups, where N is an integer more than or equal to 1, and less than or equal to M; to group domain names with differences between their attribute information being below a preset attribute threshold among the M domain names, and the association identifier information associated with the domain names into a second entity element group, and to obtain K second entity element groups, where K is an integer more than or equal to 1; to determine first cluster scores of the preset categories of the DNS system according to the N first entity element groups and the feature dimension information; to determine second cluster scores of the preset categories of the DNS system according to the K second entity element groups and the feature dimension information; and to determine the cluster scores of the preset categories of the DNS system according to the first cluster scores of the preset categories, and the second cluster scores of the preset categories.

Optionally the processor is configured: to group the association identifier information associated with each of the M domain names into a first entity element group, and to obtain N first entity element groups, where N is an integer more than or equal to 1, and less than or equal to M; to group domain names with differences between their attribute information being below a preset attribute threshold among the M domain names, and the association identifier information associated with the domain names into a second entity element group, and to obtain K second entity element groups, where K is an integer more than or equal to 1; to determine first cluster scores of the preset categories of the DNS system according to the N first entity element groups; to determine second cluster scores of the preset categories of the DNS system according to the K second entity element groups; and to determine the cluster scores of the preset categories of the DNS system according to the first cluster scores of the preset categories, and the second cluster scores of the preset categories.

Optionally the processor is further configured: for each of the N first entity element groups, to normalize each of a plurality of pieces of feature dimension information corresponding to a target domain name in the first entity element group, where the target domain name is any one of the M domain names, to determine feature dimension information corresponding to the association identifier information in the first entity element group, and to determine the first cluster score of the DNS system according to each of the plurality of pieces of normalized feature dimension information corresponding to the target domain name in the first entity element group, and the feature dimension information corresponding to the association identifier information in the first entity element group; and for each of the K second entity element groups, to normalize each of a plurality of pieces of attribute information corresponding to the domain name in the second entity element group, to determine feature dimension information corresponding to the association identifier information in the second entity element group, and to determine the second cluster score of the DNS system according to each of the plurality of pieces of normalized attribute information corresponding to the domain name in the second entity element group, and the feature dimension information corresponding to the association identifier information in the second entity element group.

Optionally the processor is further configured: to normalize each of a plurality of pieces of feature dimension information of preset categories corresponding to a target domain name, where the target domain name is any one of the M domain names; to determine an individual score of each of the preset categories of the DNS system corresponding to the target domain name according to the plurality of pieces of normalized feature dimension information of the preset categories; and to determine the total system score of the DNS system according to the cluster score of each of the preset categories of the DNS system, and the individual score of each of the preset categories of the DNS system.

Optionally the preset categories include maliciousness, popularity, and/or abnormality; and the processor is configured: to determine a system score of the maliciousness of the DNS system according to a cluster score of the maliciousness of the DNS system, and an individual score of the maliciousness of the DNS system; to determine a system score of the popularity of the DNS system according to a cluster score of the popularity of the DNS system, and an individual score of the popularity of the DNS system; to determine a system score of the abnormality of the DNS system according to a cluster score of the abnormality of the DNS system, and an individual score of the abnormality of the DNS system; and to determine the total system score of the DNS system according to the system score of the maliciousness, the system score of the popularity, and the system score of the abnormality of the DNS system.

As can be apparent from the disclosure above, in the embodiment of the invention, the DNS system is evaluated according to the M domain names, and the plurality of pieces of feature dimension information of each of the preset categories corresponding to each of the M domain names, so the DNS can be evaluated using additional feature dimensions for evaluation to thereby improve the accuracy of evaluating the DNS; and furthermore the total system score of the DNS system can be determined according to the cluster scores of the respective preset categories of the DNS system to thereby further improve the accuracy of evaluating the DNS.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for evaluating Domain Name Service (DNS), comprising:
   determining M domain names in a DNS system, and a plurality of pieces of feature dimension information of each of preset categories corresponding to each of the M domain names according to a DNS traffic log, wherein M is an integer more than or equal to 1;
   determining association identifier information associated with each of the M domain names, wherein the association identifier information comprises at least one of an IP address and identity information;
   determining a cluster score of each of the preset categories of the DNS system according to association relationships between each of the M domain names and the association identifier information and further in view of the plurality of pieces of feature dimension information of each of preset categories corresponding to each of the M domain names, or according to attribute information of each of the M domain names and further in view of the plurality of pieces of feature dimension information of each of preset categories corresponding to each of the M domain names; and
   determining a total system score of the DNS system according to the cluster score of each of the preset categories of the DNS system;
   wherein the determining the cluster score of each of the preset categories of the DNS system according to the association relationships between each of the M domain names and the association identifier information and further in view of the plurality of pieces of feature dimension information of each of preset categories corresponding to each of the M domain names, or according to the attribute information of each of the M domain names and further in view of the plurality of pieces of feature dimension information of each of preset categories corresponding to each of the M domain names comprises:
   grouping the association identifier information associated with each of the M domain names into a first entity element group, and obtaining N first entity element groups; and determining first cluster scores of the preset categories of the DNS system according to the N first entity element groups and the feature dimension information, wherein N is an integer more than or equal to 1, and less than or equal to M;
   grouping domain names with differences between their attribute information being below a preset attribute threshold among the M domain names, and the association identifier information associated with the domain names into a second entity element group, and obtaining K second entity element groups; and determining second cluster scores of the preset categories of the DNS system according to the K second entity element groups and the feature dimension information, wherein K is an integer more than or equal to 1; and
   determining the cluster scores of the preset categories of the DNS system according to the first cluster scores of the preset categories and the second cluster scores of the preset categories.

2. The method according to claim 1, wherein the determining the first cluster scores of the preset categories of the DNS system according to the N first entity element groups and the feature dimension information comprises:
   for each of the N first entity element groups,
   normalizing each of a plurality of pieces of feature dimension information corresponding to a target domain name in the first entity element group, wherein the target domain name is any one of the M domain names,
   determining feature dimension information corresponding to the association identifier information in the first entity element group, and
   determining the first cluster score of the DNS system according to each of the plurality of pieces of normalized feature dimension information corresponding to the target domain name in the first entity element group and the feature dimension information corresponding to the association identifier information in the first entity element group; and the determining the second cluster scores of the preset categories of the DNS system according to the K second entity element groups and the feature dimension information comprises:

for each of the K second entity element groups, normalizing each of a plurality of pieces of attribute information corresponding to the domain name in the second entity element group, determining feature dimension information corresponding to the association identifier information in the second entity element group, and determining the second cluster score of the DNS system according to each of the plurality of pieces of normalized attribute information corresponding to the domain name in the second entity element group and the feature dimension information corresponding to the association identifier information in the second entity element group.

3. The method according to claim 1, wherein the determining the total system score of the DNS system according to the cluster score of each of the preset categories of the DNS system comprises:

normalizing each of a plurality of pieces of feature dimension information of preset categories corresponding to a target domain name, wherein the target domain name is any one of the M domain names;

determining an individual score of each of the preset categories of the DNS system according to the plurality of pieces of normalized feature dimension information of the preset categories corresponding to the target domain name; and determining the total system score of the DNS system according to the cluster score of each of the preset categories of the DNS system and the individual score of each of the preset categories of the DNS system.

4. The method according to claim 3, wherein the preset categories comprise maliciousness, popularity, and abnormality; and the determining the total system score of the DNS system according to the cluster score of each of the preset categories of the DNS system comprises:

determining a system score of the maliciousness of the DNS system according to a cluster score of the maliciousness of the DNS system and an individual score of the maliciousness of the DNS system;

determining a system score of the popularity factor of the DNS system according to a cluster score of the popularity of the DNS system and an individual score of the popularity of the DNS system;

determining a system score of the abnormality of the DNS system according to a cluster score of the abnormality of the DNS system and an individual score of the abnormality of the DNS system; and determining the total system score of the DNS system according to the system score of the maliciousness, the system score of the popularity, and the system score of the abnormality of the DNS system.

5. An electronic device, comprising: a processor, a memory, a bus interface, all of which are connected with each other over a bus, wherein:

the processor is configured to read programs in the memory and to execute the programs: to determine M domain names in a Domain Name Service (DNS) system, and a plurality of pieces of feature dimension information of each of preset categories corresponding to each of the M domain names according to a DNS traffic log, wherein M is an integer more than or equal to 1; to determine association identifier information associated with each of the M domain names, wherein the association identifier information comprises at least one of an IP address and identity information; to determine a cluster score of each of the preset categories of the DNS system according to association relationships between each of the M domain names and the association identifier information and further in view of the plurality of pieces of feature dimension information of each of preset categories corresponding to each of the M domain names, or according to attribute information of each of the M domain names and further in view of the plurality of pieces of feature dimension information of each of preset categories corresponding to each of the M domain names; and to determine a total system score of the DNS system according to the cluster score of each of the preset categories of the DNS system; and the memory is configured to store one or more executable programs, and data for use by the processor to perform operations;

wherein the processor is configured:

to group the association identifier information associated with each of the M domain names into a first entity element group, and to obtain N first entity element groups, wherein N is an integer more than or equal to 1, and less than or equal to M;

to group domain names with differences between their attribute information being below a preset attribute threshold among the M domain names, and the association identifier information associated with the domain names into a second entity element group, and to obtain K second entity element groups, wherein K is an integer more than or equal to 1;

to determine first cluster scores of the preset categories of the DNS system according to the N first entity element groups and the feature dimension information;

to determine second cluster scores of the preset categories of the DNS system according to the K second entity element groups and the feature dimension information; and to determine the cluster scores of the preset categories of the DNS system according to the first cluster scores of the preset categories, and the second cluster scores of the preset categories.

6. The electronic device according to claim 5, wherein the processor is configured: for each of the N first entity element groups, to normalize each of a plurality of pieces of feature dimension information corresponding to a target domain name in the first entity element group, wherein the target domain name is any one of the M domain names, to determine feature dimension information corresponding to the association identifier information in the first entity element group, and to determine the first cluster score of the DNS system according to each of the plurality of pieces of normalized feature dimension information corresponding to the target domain name in the first entity element group, and the feature dimension information corresponding to the association identifier information in the first entity element group; and for each of the K second entity element groups, to normalize each of a plurality of pieces of attribute information corresponding to the domain name in the second entity element group, to determine feature dimension information corresponding to the association identifier information in the second entity element group, and to determine the second cluster score of the DNS system according to each of the plurality of pieces of normalized attribute information corresponding to the domain name in the second entity element group, and the feature dimension information corresponding to the association identifier information in the second entity element group.

7. The electronic device according to claim 5, wherein the processor is further configured: to normalize each of a plurality of pieces of feature dimension information of preset categories corresponding to a target domain name, wherein the target domain name is any one of the M domain names; to determine an individual score of each of the preset categories of the DNS system according to the plurality of pieces of normalized feature dimension information of the preset categories corresponding to the target domain name; and to determine the total system score of the DNS system according to the cluster score of each of the preset categories of the DNS system, and the individual score of each of the preset categories of the DNS system.

8. The electronic device according to claim 7, wherein the preset categories comprise maliciousness, popularity, and abnormality; and the processor is configured: to determine a system score of the maliciousness of the DNS system according to a cluster score of the maliciousness of the DNS system, and an individual score of the maliciousness of the DNS system; to determine a system score of the popularity of the DNS system according to a cluster score of the popularity of the DNS system, and an individual score of the popularity of the DNS system; to determine a system score of the abnormality of the DNS system according to a cluster score of the abnormality of the DNS system, and an individual score of the abnormality of the DNS system; and to determine the total system score of the DNS system according to the system score of the maliciousness, the system score of the popularity, and the system score of the abnormality of the DNS system.

9. A non-transitory computer readable storage medium, storing computer instructions that, when executed by a computer, cause the computer to perform the method according to claim 1.

10. A computer program product, comprising computer program stored on a non-transitory computer readable storage medium, the computer program comprising program instructions that, when executed by a computer, cause the computer to perform the method according to claim 1.

* * * * *